United States Patent [19]
Penczak et al.

[11] Patent Number: 6,072,121
[45] Date of Patent: Jun. 6, 2000

[54] PRESET INSERT HOUSING FOR UNDERFLOOR RACEWAYS

[75] Inventors: John P. Penczak, Washington, W. Va.; Thomas R. Russo, Bristol, Conn.

[73] Assignee: Walker Systems, Inc., Williamstown, W. Va.

[21] Appl. No.: 09/211,464

[22] Filed: Dec. 14, 1998

[51] Int. Cl.[7] .................................................. H02G 3/04
[52] U.S. Cl. ................ 174/48; 174/49; 174/58; 174/63; 220/3.2; 220/4.02; 52/220.7
[58] Field of Search ................... 174/48, 49, 95, 174/58, 17 R, 63, 52.6; 52/220.1, 220.3, 220.5, 220.7; 220/3.2, 3.3, 3.6, 3.8, 3.94, 4.02, 4.08; 439/535

[56] References Cited

U.S. PATENT DOCUMENTS

| | | |
|---|---|---|
| 4,247,738 | 1/1981 | Bonato . |
| 4,295,575 | 10/1981 | Flachbarth . |
| 4,536,612 | 8/1985 | Domigan . |
| 4,922,672 | 5/1990 | Bartee et al. . |
| 5,350,884 | 9/1994 | Littrell . |
| 5,614,695 | 3/1997 | Navazo ..................... 174/48 |
| 5,736,676 | 4/1998 | Stelter et al. . |

FOREIGN PATENT DOCUMENTS

| | | | |
|---|---|---|---|
| 2083957 | 3/1982 | United Kingdom ................ | 174/48 |

*Primary Examiner*—Dean A. Reichard
*Assistant Examiner*—Dhiru R Patel
*Attorney, Agent, or Firm*—McAndrews, Held & Malloy, Ltd.

[57] ABSTRACT

A preset is provided for providing access at selected locations to an underfloor electrical distribution system of the type consisting of at least one raceway panel adapted to be positioned in a concrete floor. The raceway panel defines an interior passage adapted to carry service cables and has an exterior wall defining a preset opening that provides access to the interior passage. The presets can be located at any location where an opening is punched in the raceway panel, with 12 inch or 24 inch intervals being mostcommon. The preset includes a housing having an interior compartment, a concrete cap, and a knockout section. The concrete cap and the knockout section can be removed to provide access to the interior compartment of the preset housing. The knockout is positioned to align with and lockingly engage with the preset opening to secure the preset to the raceway panel during pouring of the concrete floor. Upon hardening of the concrete floor, the concrete above the preset can be broken away to permit removal of the concrete cap. The knockout can then be removed to provide access to the interior passage of the raceway panel through the preset. Alignment clips are provided for securing and aligning presets carried by adjacent raceway panels. The side walls of the preset are beveled inwardly such that the base of the preset is larger than the top. This design further restricts vertical movement of the preset after the concrete has hardened.

8 Claims, 7 Drawing Sheets

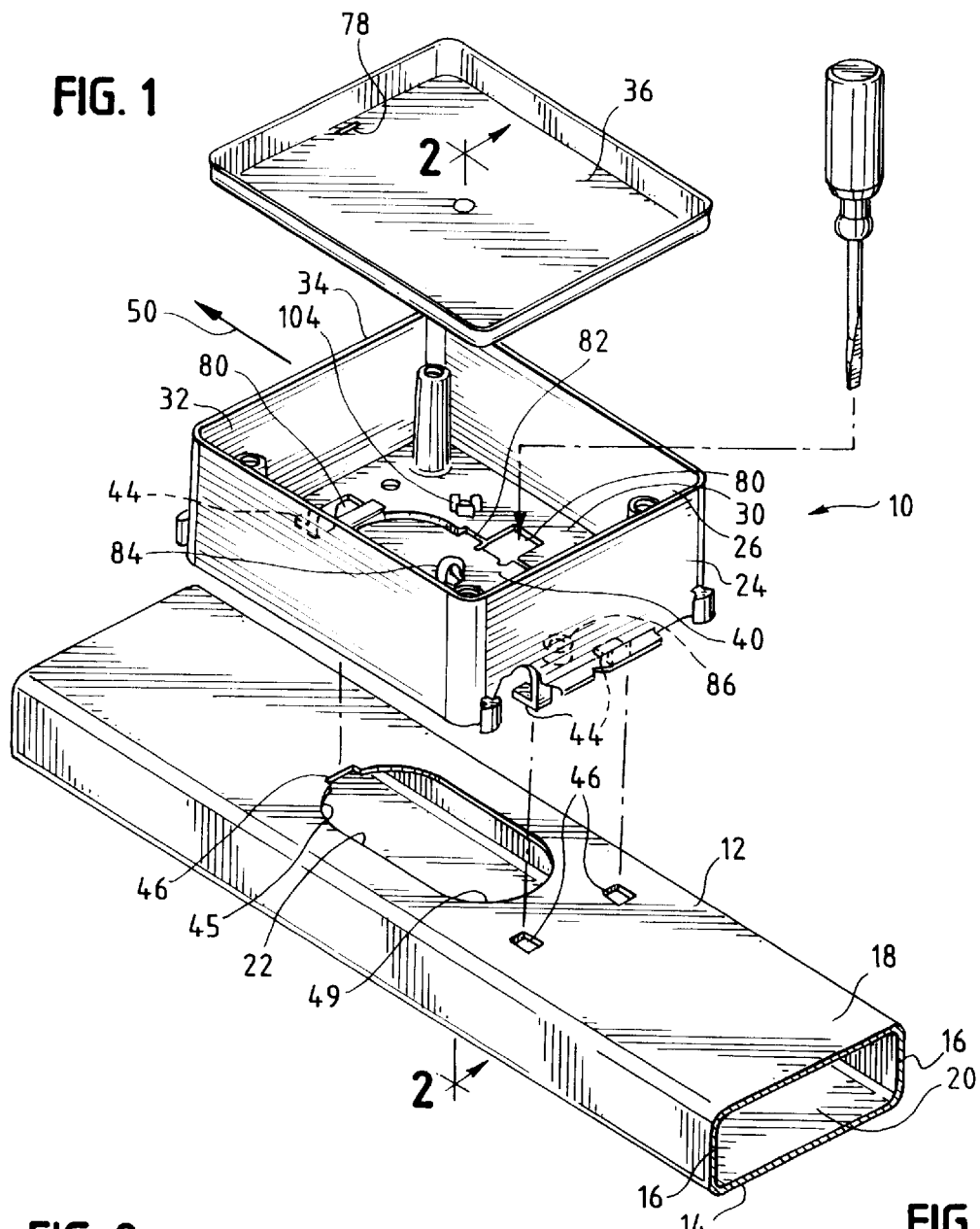
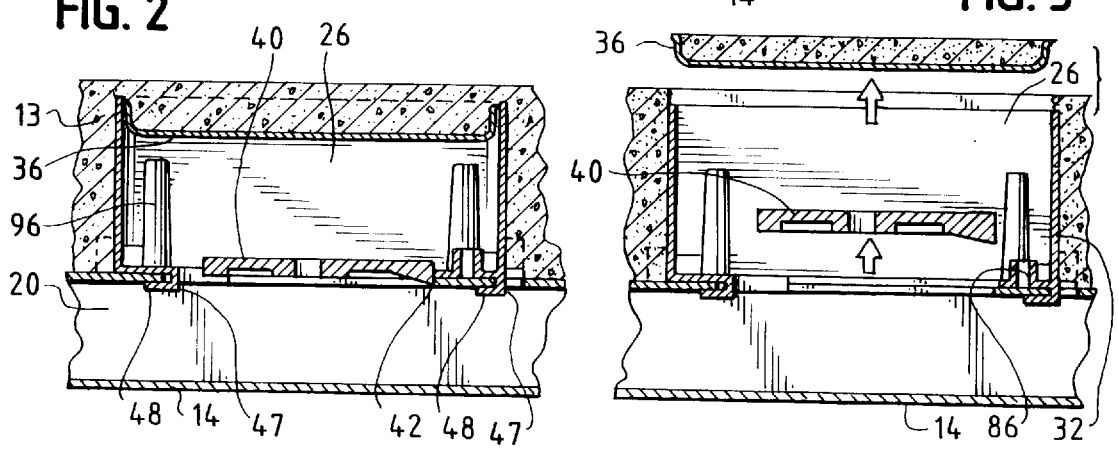

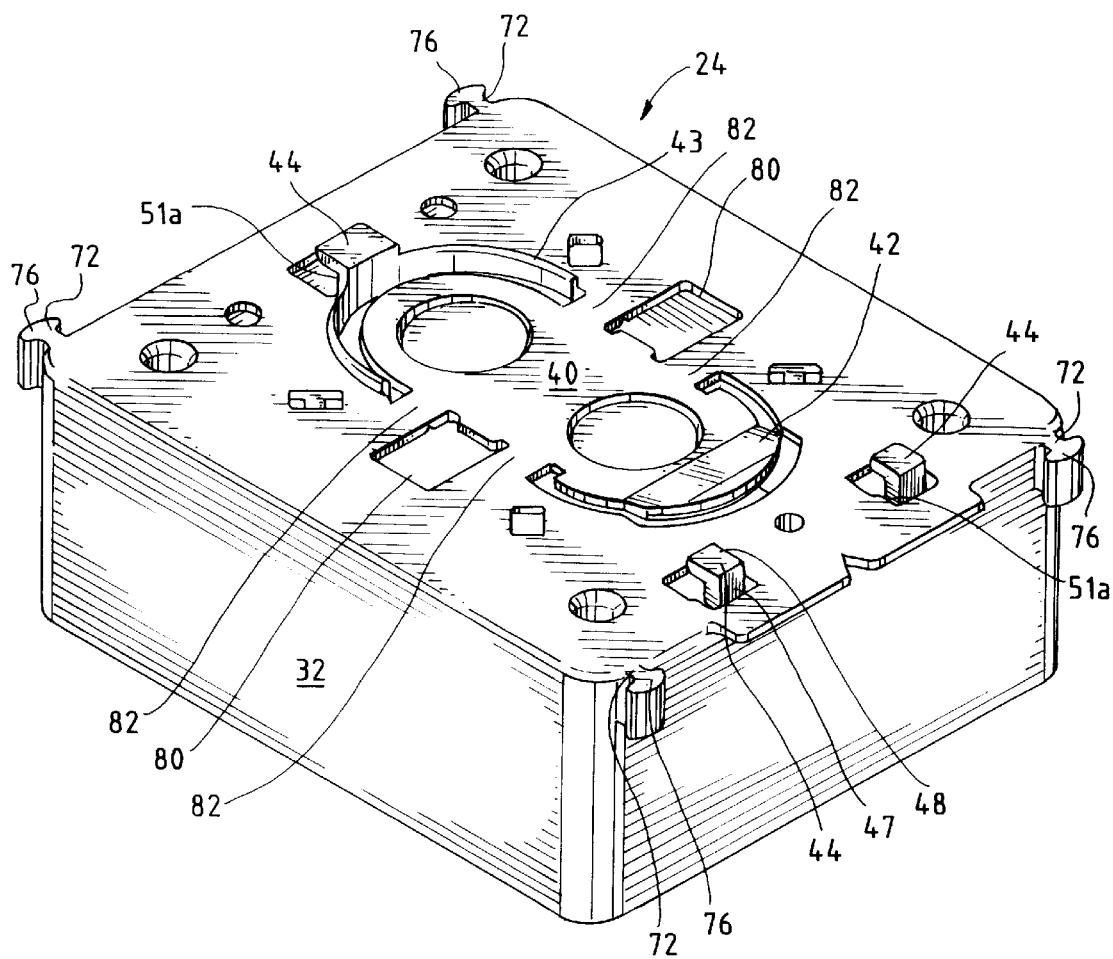

PRESET INSERT HOUSING FOR UNDERFLOOR RACEWAYS

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

This invention relates generally to underfloor electrical distribution systems, and, more particularly, to an improved underfloor preset housing. Modern office buildings require electric power, communication, and computer data services in various combinations at a large number of locations. In many instances these needs are addressed by underfloor distribution systems consisting of a network of ducts or raceways that are mounted in concrete floors. Access to the underfloor service raceways is obtained through presets that are mounted on the raceways at regular intervals, usually 24 inches on center, before the concrete floor is poured. The preset defines a hollow interior compartment that is interconnected with the interior of the duct to provide access to the services that are carried in the duct. The preset includes a removable mud cap that is generally parallel to the surface of the floor and is positioned slightly below the surface of the concrete floor. The mud cap serves to prevent concrete from entering the interior compartment of the preset when the floor is poured. After the concrete floor has hardened, the concrete above the mud cap is broken away and the mud cap is removed to provide access to the interior of the preset. An activation assembly that provides for power or data outlets may then be installed on the preset.

In the past, presets have typically been connected to the ducts by swaging or pop rivets. Connecting the presets in this fashion is labor intensive and expensive, especially in large office complexes where a large number of presets is required. Additionally, if the wrong size preset is installed on the duct it is difficult to remove the preset without damaging the duct.

BRIEF SUMMARY OF THE INVENTION

One object of the invention is to provide a preset that can be connected to a raceway panel without the use of fasteners, rivets or swaging.

Yet another object of the present invention is to provide a preset that can be removed from a raceway panel without damaging the raceway panel.

An additional object of the invention is to provide a manner for interconnecting and aligning presets carried by adjacent raceway panels.

Still another object of the invention is to provide a preset that can accommodate a wide variety of activation assemblies.

Yet another object of the invention is to provide a preset that is economical to manufacture in mass production, and easily installed in the field without fasteners.

One or more of the preceding objects preset for providing access to an underfloor electrical distribution system of the type consisting of at least one raceway panel adapted to be positioned in a concrete floor. The raceway panel defines an interior passage adapted to carry service cables and has an exterior wall defining a preset opening that provides access to the interior passage. The preset includes a housing having an interior compartment, a concrete cap (i.e., mud cap), and a knockout section. The concrete cap and the knockout section can be removed to provide access to the interior compartment of the preset housing. The knockout is positioned to align with and lockingly engage with the preset opening to secure the preset to the raceway panel during pouring of the concrete floor. Upon hardening of the concrete floor, the concrete above the preset can be broken away to permit removal of the concrete cap. The knockout can then be removed to provide access to the interior passage of the raceway panel through the preset. An alignment clip can be used to secure and align presets carried by adjacent raceway panels.

BRIEF DESCRIPTION OF THE SEVERAL VIEWS OF THE DRAWING

FIG. 1 is an exploded perspective view of a preset insert housing according to the present invention, shown in combination with an underfloor wiring duct.

FIG. 2 is cross-sectional view illustrating the preset insert housing in a poured concrete floor, prior to installation of the activation assembly.

FIG. 3 is a cross-sectional view of the preset insert housing, illustrating removal of the concrete cap and the knockout section.

FIG. 4B is a bottom perspective view of a preset insert housing according to the present invention.

DETAILED DESCRIPTION OF THE INVENTION

Figure 4A:
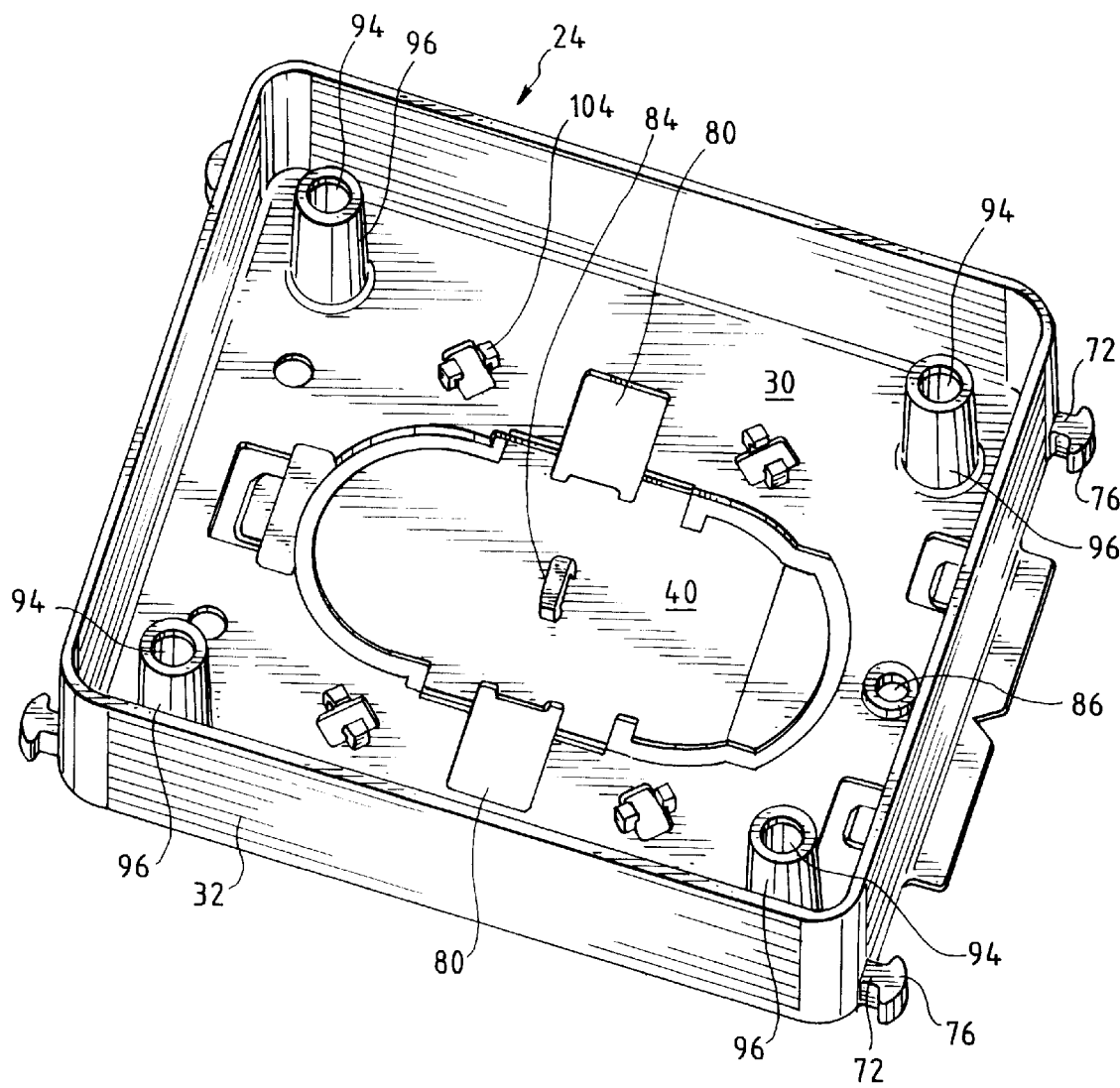
FIG. 4A is a top perspective view of a preset insert housing according to the present invention.
Figure 5:
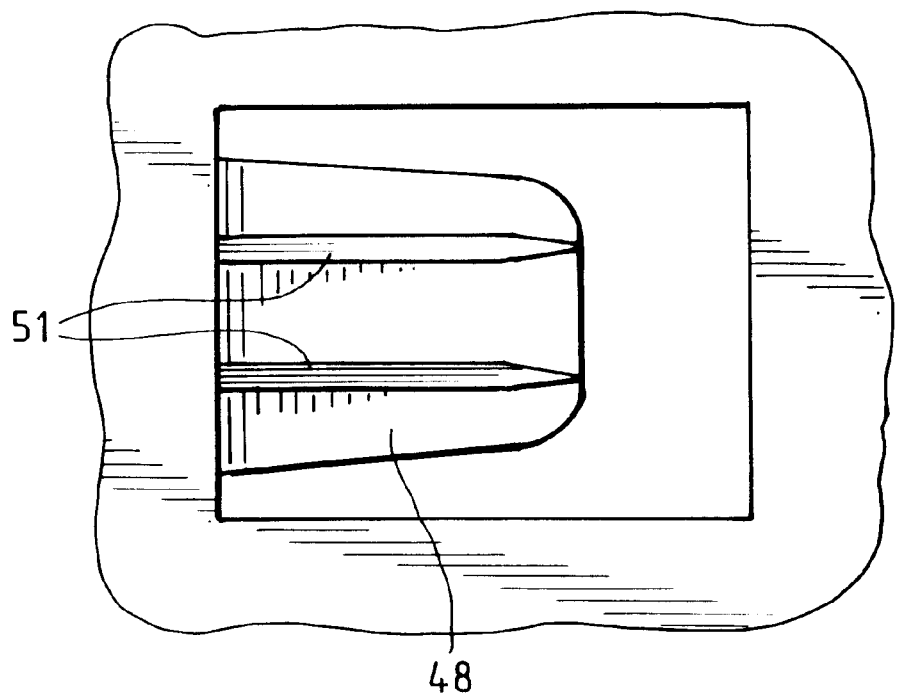
FIG. 5 is a top view of one of the locking tabs.

While the invention will be described in connection with one or more embodiments, it will be understood that the invention is not limited to those embodiments. On the contrary, the invention includes all alternatives, modifications, and equivalents as may be included within the spirit and scope of the appended claims.

Referring now to FIGS. 1–8, an underfloor electrical distribution system 10 includes a plurality of raceway panels 12 (one shown) adapted to be positioned on a subfloor prior to pouring of the concrete floor 13. The raceway panels 12 are laid out in accordance with a predetermined pattern to route service cables to desired locations in the building. Each raceway panel 12 consists of a metallic duct of a generally rectangular cross section. The raceway panel 12 has a bottom wall 14, a pair of opposing side walls 16, and an upper wall 18 which define an interior passage 20 for carrying the service cables. Preset openings 22 are formed in the upper wall 18 of the raceway panel 12 to provide access to the interior passage 20.

Presets 24 (one shown in FIG. 1) are configured to be mounted in the preset openings 22 and to provide access to the interior passage 20 of the raceway 12 from the upper surface of the concrete floor 13. The preset 24 defines a hollow interior compartment 26 that is interconnectable with the interior passage 20 of the raceway panel 12 to provide access to the service cables that are carried in the raceway panel 12. In the illustrated embodiment, the preset 24 has a generally rectangular housing consisting of a bottom wall 30, an upstanding side wall 32 defining a top opening 34, and a concrete cap 36 (i.e., mud cap) that is removably mounted in the top opening 34. Although a rectangular housing is illustrated, it should be appreciated that the housing could be cylindrical, for example, without departing from the scope of the present invention. Preferably, the side wall 32 of the preset housing is angled or beveled inwardly a slight amount, e.g. approximately 1.0 degrees from vertical, to restrict upward movement of the housing once the concrete floor has hardened.

As shown in FIG. 2, upon installation of the preset 24 and pouring of the concrete floor 13, the concrete cap 36 is generally parallel to the surface of the concrete floor and is positioned slightly below the surface of the concrete floor. The concrete cap 36 serves to prevent concrete from entering the interior compartment 26 of the preset 24 when the concrete floor 13 is poured. After the concrete floor 13 has hardened, the concrete above the concrete cap 36 is broken away and the concrete cap is removed to provide access to the interior 26 of the preset 24 (see FIG. 3). As explained below, an activation assembly that accepts a duplex receptacle or other wiring device may then be installed on the preset 24.

A knockout section 40 is formed in the bottom wall of the preset housing 24. The knockout section 40 is positioned to align with and lockingly engage with the preset opening 22 to secure the preset 24 to the raceway panel 12 prior to and during pouring of the concrete floor 13. For this purpose, the lower edge of the knockout section 40 includes a beveled protrusion 42 (see, e.g., FIGS. 2 and 4B) that extends beyond the plane of the bottom wall 30 of the preset and into the present opening 22. The preset 24 is further secured in the opening 22 by a radial flange 43 that extends downwardly from the bottom wall 30 along the periphery of the knockout 40 on the side opposite that of the beveled protrusion 42. The radial flange 43 is configured to engage against the front edge of the preset opening 22 when the preset is mounted on the raceway panel. The preset 24 further includes a plurality (three in the illustrated embodiment) of locking tabs 44 that extend from the bottom wall 30 and are configured to slidably engage with reciprocal apertures 46 formed in the raceway panel 12 adjacent the preset opening 22. Each locking tab 44 consists of a downwardly extending leg 47 and flange 48 extending generally perpendicular from the bottom end of the leg, i.e., generally parallel to the bottom wall 30 of the preset 12.

Figure 6:
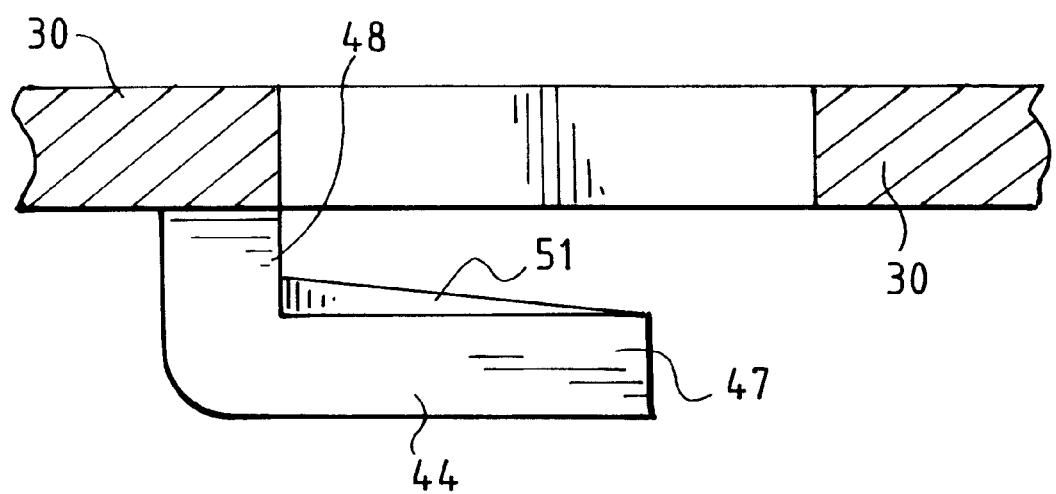
FIG. 6 is a cross sectional view of one of the locking tabs.

The manner by which the preset 24 is attached to the raceway panel 12 is best understood by reference to FIGS. 1 and 2. Initially the locking tabs 44 are aligned with the reciprocal apertures 46 in the raceway panel 12. The tabs 44 are then inserted downwardly into the apertures 46, while the preset is simultaneously slid in the direction of the arrow 50. As the tabs 44 move downwardly into the apertures 46, the lower edge of the protrusion 42 engages against the upper wall 18 of the raceway panel 12. Further downward movement of the preset 12 biases the protrusion 42 upwardly. The preset 24 is slid in the direction of the arrow 50 until the trailing edge of the protrusion 42 extends past the edge of the preset opening 22, at which time the protrusion 42 springs downwardly to lock the preset 24 into the preset opening 22 (see FIG. 2). At this position, the lower flanges 48 of the locking tabs 44 extend under the upper wall 18 of the raceway panel 12, to further secure the preset 24 to the raceway panel 12. Ribs 51 formed in the upper surface of the flanges 48 (see FIGS. 5 and 6) are compressed between the flanges 48 and the upper wall of the raceway as the preset 24 is slid into position to form good ground continuity between the preset 24 and the raceway 12. As can be seen in FIG. 6, the ribs 51 may be beveled or tapered to an increasing height near the back edge of the flange 48. A plurality of ribs 52 (see generally FIG. 10) may be formed in the exterior surface of the bottom wall 30 of the preset 24. As the preset 24 is slid into place, the ribs 52 abrade against the exterior surface of the raceway panel 12 to form good ground continuity between the preset and the raceway panel.

Ribs 51A along sides or legs 47 (FIG. 4B) can also provide ground continuity and restrict lateral movement.

Further movement in the direction of the arrow 50 is restricted by the interface between the legs 47 and the walls of the apertures 46, and also by abutment of the radial flange 43 against the front edge 45 of the preset opening 22. Conversely, movement in the direction opposite the arrow 50 is restricted by abutment of the protrusion 42 against the back edge 49 of the opening 22. If necessary, the preset 24 can be removed prior to pouring the concrete floor by prying out the knockout section 40, or by bending the trailing edge of the protrusion 42 upwardly and sliding the preset 24 in the direction opposite arrow 50.

The preset 24 is preferably formed of a die cast metal, and in particular from Zamak 3 which is commercially available from a variety of suppliers including Eastern Alloys of Maybrook, N.Y., ARCO Alloys Corporation of Detroit Mich., and Imperial Zinc Corporation of Chicago, Ill. Zamak 3 is an alloy of zinc, aluminum, magnesium, and copper. Alternatively, the preset 24 could be formed from other metals or from plastic.

Figure 9:
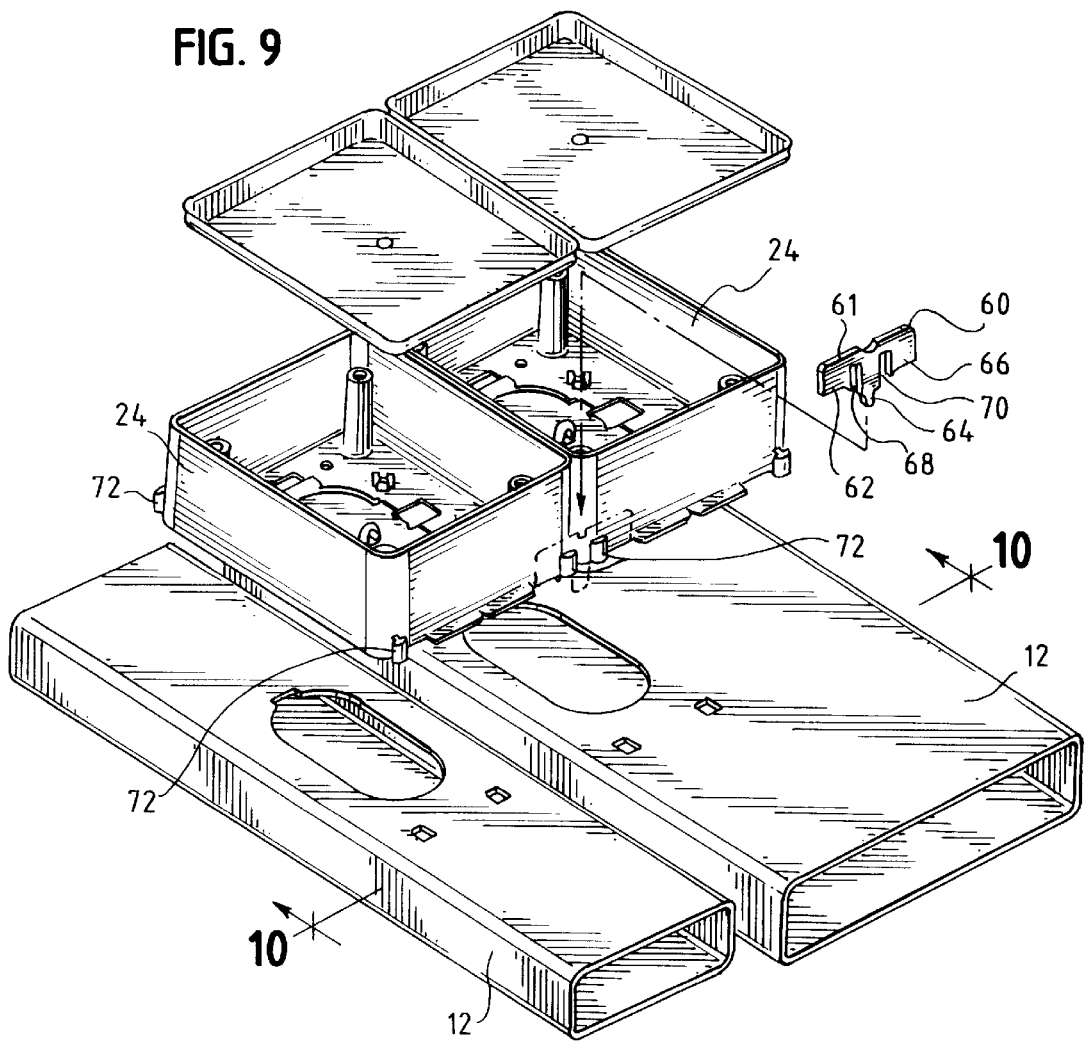
FIG. 9 is an exploded perspective view illustrating a pair of gangable preset insert housings in accordance with the present invention.
Figure 10:
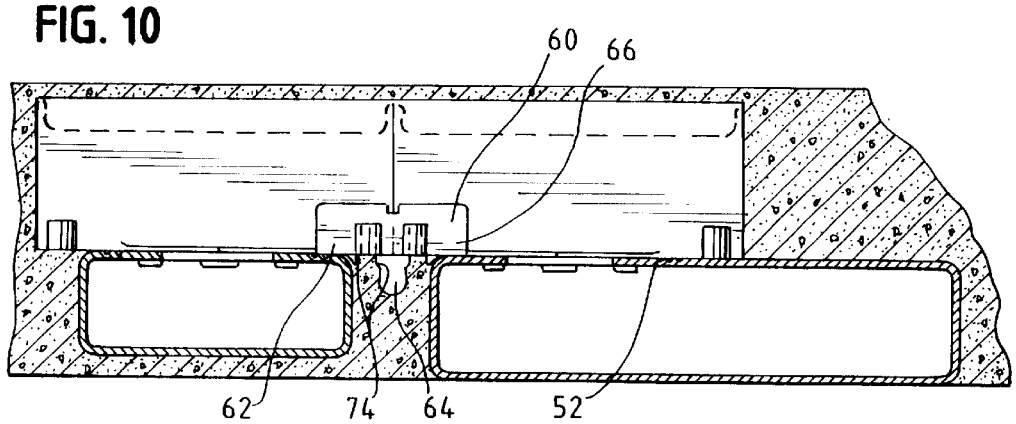
FIG. 10 is a cross-sectional view of a pair of ganged preset insert housings installed in a poured concrete floor, prior to activation of the preset.
Figure 11:
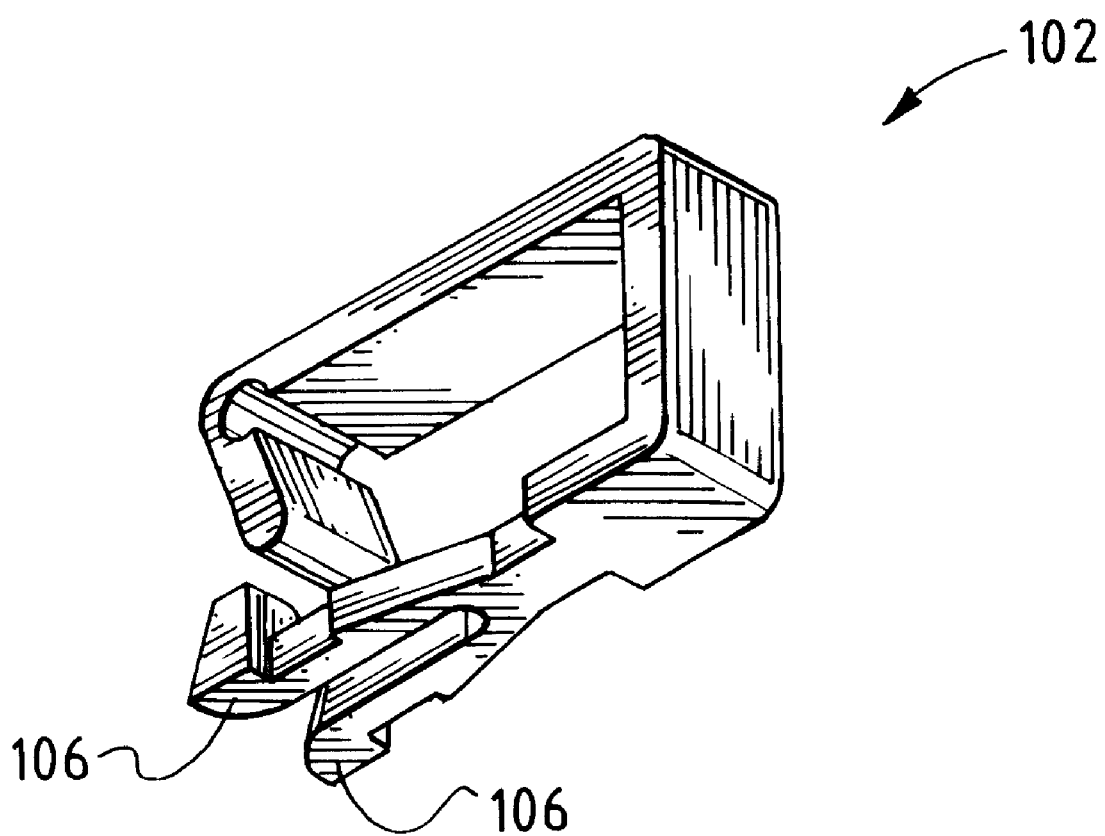
FIG. 11 is a perspective view of a wire retention clip that can be used in conjunction with the preset insert housing.

FIGS. 9 and 10 illustrate the use of alignment clips 60 to interconnect and align presets carried by adjacent raceway ducts 12. Each alignment clip 60 has an upper portion 61 and three legs 62, 64, 66 extending downwardly from the upper portion. The legs 62, 64, 66 are separated by vertical slots 68, 70 which configured to engage around tabs 72 that extend from the corners of the presets 24. In addition to interconnecting the presets 24, the alignment clips 60 maintain a uniform space between the presets 22 and hence the adjacent raceway panels 12. The alignment clips 60 are installed by aligning the vertical slots 68, 70 with the tabs 72 on the presets 22. As the alignment clip 60 is pushed or driven downwardly, teeth 74 formed on the lower edges of the legs 62–66 engage against the top edges of the tabs 72. Continued downward pressure on the alignment clip 60 causes the teeth 74 to abrade the tabs 72 that are formed from the relatively softer Zamak 3 material, thereby allowing the clip to slide into place over the tabs 72. (The clips 60 could alternatively be configured to snap into place around the tabs 72.) Heads 76 formed on the ends of the tabs 72 further secure the clip 60 in place on the tabs 72.

Figure 7:
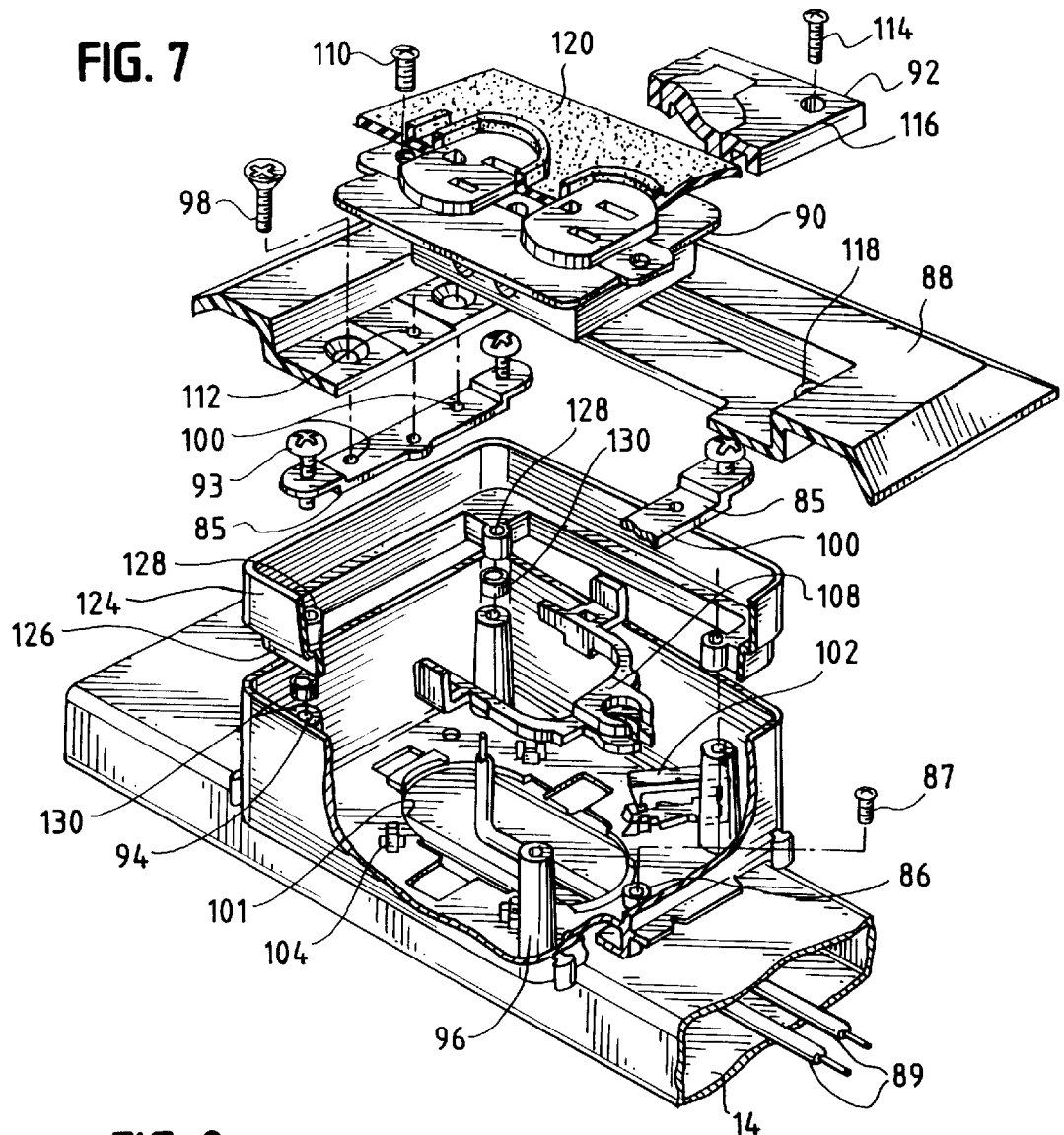
FIG. 7 is an exploded perspective view illustrating installation of activation assembly into the preset insert housing.
Figure 8:
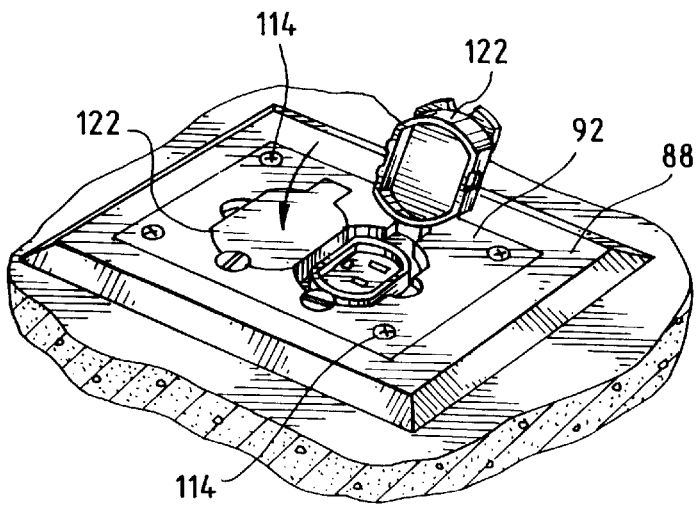
FIG. 8 is a top perspective view of the assembly of FIG. 4 after it has been installed in a concrete floor.

Installation of an activation kit into the preset 24 is illustrated in FIGS. 3, 7 and 8. Specifically, when a preset 24 is to be activated, the concrete overlying the preset is broken away to provide access to the concrete cap 36. The concrete cap 36 is then pried out of the preset (as is shown in FIG. 3). Striking the mud cap 36 at 78 with a screwdriver or cold chisel will deflect the edge inward to assist with removal of the concrete cap. Once the concrete cap 36 is removed, the knockout 40 is removed to gain access to the interior passage 20 of the raceway 12, as shown in FIG. 1. The knockout 40 can be pried out by inserting a screwdriver into the slots 80 formed at the periphery of the knockout and twisting the screwdriver to break the retaining tabs 82. An arched member 84 extends upwardly from the center of the knockout 40. A wire can be hooked through the arched member 84 to prevent the knockout 40 from falling into the raceway panel 12 as the knockout 40 is pried from the preset 24. Another function of the knockout is to prevent fish tapes from entering unactivated openings. Fish tapes may be pushed through the raceway panel 100 feet or more. With presets on 24" centers, the fish tape will easily pass by the unactivated presets.

Removal of the knockout creates an opening 101 that overlies the preset opening 22 in the raceway panel 12. Service cables 89 (e.g., electric wires, fiber optic cables, telephone lines, etc.) can be routed into and out of the raceway panel through the openings 22, 101. The top opening 34 in the preset 24 is configured to receive a variety of activation assemblies. In FIGS. 7 and 8, the activation assembly is illustrated as a flush mount duplex electrical outlet. It will be appreciated, however, that numerous other activation assemblies can be employed with the preset without departing from the scope of the claimed invention.

The duplex activation assembly includes link straps 85, a carpet flange 88, a duplex receptacle 90, and a concrete cap 92. The link straps 85 are secured in the inner compartment 26 of the preset 24 with self-taping screws 93 that thread into reciprocal bores 94 formed in upwardly extending bosses 96 located in the corners of the interior compartment 26. The carpet flange 88 overlies the top of the preset 24 and is secured thereto by screws 98 that thread into apertures 100 in the link straps 85. The service cables 89 carried in raceway panel 12 are routed up through the knockout opening 101 and into the interior compartment 26 of the preset 24. Excess wire can be looped around wire retaining clips 102 that are positioned around the periphery of the knockout opening 101. The wire retaining clips 102 are formed from a non-conductive material such as nylon and are adapted to snap into place into reciprocal mounting brackets 104 formed in the bottom wall of the interior compartment. As can be seen in FIG. 10, the wire retaining clips 102 are generally U-shaped and have forked bottom legs 106 which slide into the mounting brackets 104. A grommet 108 may be secured in the knockout opening 101 to provide a smooth, non-abrasive surface for pulling wires into and out of the raceway panel 12. The grommet 108 is made from a non-conductive material, such as nylon, and is constructed to snap into place in the opening 101 after the knockout 40 has been removed.

The wires 89 are appropriately connected to the electrical outlet 90 and the outlet is secured in place by mounting screws 110 that thread into apertures 112 the carpet flange 88. The concrete cap 92 is generally rectangular and is sized to fit within a reciprocal recess formed in the top of the carpet flange. Fasteners 114 extend through apertures 116 in the corners of the concrete cap 92 and thread into reciprocal apertures 118 in the carpet ring 88 to secure the concrete cap in place. A rubber gasket 120 may be interposed between the concrete cap 92 and the carpet flange 88 to prevent contaminants from entering the interior compartment. The concrete cap 92 has hinged doors 122 that can be pivoted upwardly to access the outlets in the duplex receptacle 90 (see FIG. 8).

A threaded aperture 86 extends through the bottom wall of the preset and overlies the top wall 18 of the raceway. A screw 87 is threaded through the aperture 86 and until it engages securely against the top wall 18 of the raceway 12 to provide ground continuity between the preset and the raceway.

As shown in FIG. 7, an extension sleeve 124 may be interposed between the preset housing 24 and the carpet flange 88 to increase the depth of the preset 22 when a thicker concrete floor is required. The extension sleeve 124 is generally rectangular and includes a downwardly extending side wall 126 sized to fit within the side wall of the preset 24. Bosses 128 are positioned in the extension sleeve 124 to align with the bosses 96. The extension sleeve 124 is secured in place by coupling rings 94 that are press fit between bosses 94 and 96. Alternatively, the extension sleeve may be secured in place by self taping screws (not shown) which extend through the boss 94 and thread into the bosses 96.

What is claimed is:

1. A preset for providing access to an underfloor electrical distribution system, the underfloor electrical distribution system comprising at least one raceway panel adapted to be positioned in a concrete floor, the raceway panel defining an interior passage adapted to carry service cables and having an exterior wall defining a preset opening that provides access to the interior passage, the preset comprising:

a housing defining an interior compartment, the housing having bottom wall, a sidewall extending from the bottom wall and defining an upper opening to the interior compartment, and a concrete cap removably mounted in the upper opening, the bottom wall further including a removable knockout section positioned to align with the preset opening and, upon its removal, to provide access to the raceway passage through the preset interior compartment, the knockout section including a protruding portion that is configured to engage with the raceway opening to secure the preset housing to the raceway during pouring of the concrete floor.

2. A preset as set forth in claim 1, further comprising a locking tab extending from the bottom wall of the housing, the locking tab being adapted to slidably engage with the raceway panel as the knockout protruding portion of the section is engaged with the raceway opening to further secure the preset to the raceway panel.

3. A preset as set forth in claim 1, wherein the housing if formed of plastic.

4. A preset as set forth in claim 1, wherein the preset housing is formed of metal.

5. A preset as set forth in claim 1, further comprising ribs extending from the bottom wall of the housing, the ribs being adapted to engage against the surface of the raceway panel when the housing is mounted on the raceway panel to provide ground continuity between the raceway panel and the housing.

6. A preset as set forth in claim 1, wherein the housing is generally rectangular.

7. A preset as set forth in claim 1, further comprising wire retaining clips removable mountable in the interior compartment of the housing about the periphery of the knockout section.

8. A preset as set forth in claim 1, wherein the upper opening of the housing is adapted to receive an access assembly upon removal of the concrete cap.

* * * * *